Jan. 1, 1952

J. J. MERKLINGER 2,580,690

RADIO APPARATUS

Filed May 31, 1946

INVENTOR.
JOHN J. MERKLINGER
BY
Carl H. Synnestvedt
AGENT

Patented Jan. 1, 1952

2,580,690

UNITED STATES PATENT OFFICE 2,580,690

RADIO APPARATUS

John J. Merklinger, Philadelphia, Pa., assignor to Philco Corporation, Philadelphia, Pa., a corporation of Pennsylvania Application May 31, 1946, Serial No. 673,226

3 Claims. (Cl. 250—20)

The present invention relates to radio apparatus and more particularly to radio receivers adapted for use in the reception of frequency modulated carrier waves. Specifically, the invention pertains to improved means for eliminating one of the most common causes of microphonic action in radio receivers of the type above mentioned.

It is generally known in the art that when the receiver chassis is in the vicinity of the loud-speaker, as in the case of an ordinary home radio receiver, there is always the possibility that sound vibrations will affect the radio receiver in such a manner as to produce acoustic feedback. This action causes objectionable "howling" in the audio system and may arise from vibrations transmitted to tuning elements of the receiver through the air, as well as through the cabinet structure. I have found that the rotor plates of the tuning condenser associated with the local oscillator in frequency modulation receivers, are extremely sensitive to vibrations, and this frequently gives rise to microphonic action because such plates have a natural period of vibration within the audio frequency range. Vibrations transmitted to and picked up by these plates, cause variations in capacity resulting in like variations in the operating frequency of the oscillator. Consequently, audio frequency modulation of the intermediate frequency carrier wave occurs. This spurious modulation is detected, in the frequency detector, along with the desired frequency modulation, and reaches the loud-speaker where it may be reproduced in the form of whistling or howling sounds.

It is, therefore, the primary object of the invention to prevent the occurrence of undesired microphonic noises due to vibrations of tuning-condenser plates of the kind specified above. To that end the invention employs a novel arrangement effective to prevent the plates from vibrating with sufficient amplitude and at such frequency as to initiate a microphonic action. The arrangement, in accordance with the invention, imparts to the plates such stiffness in relation to their mass that vibration within the audio frequency range is effectively prevented.

Another object of the invention is to provide a device of simple construction which can be readily associated with the rotor plates included in the tuning condenser of a local oscillator, and which when so associated, raises the resonant frequency of the plates outside of the audio band, thereby preventing acoustic regeneration due to vibration of said plates.

Still another and more specific object of the invention resides in providing means particularly adapted for engagement with condenser plates of the type aforementioned, and for adjustable positioning thereon so as to produce a damping effect which so nullifies vibration of said plates as to prevent undesired modulation of the intermediate frequency carrier wave.

These and other objects, and the manner in which they are attained, will appear from the following description based on the accompanying drawings which illustrate a preferred embodiment of the invention.

Figure 1:
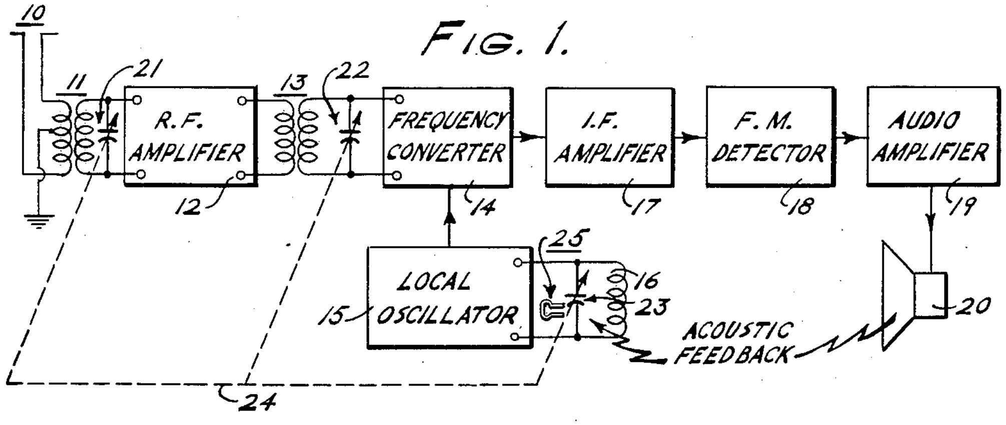
Figure 1 is a schematic representation of a conventional frequency modulation receiver, and shows the invention applied thereto.

Referring more particularly to the drawings, the frequency modulation receiver schematically shown in Figure 1, includes an antenna 10, a tuned antenna transformer 11, a tuned radio frequency stage comprising a radio frequency amplifier 12 and a tuned transformer 13, a frequency converter 14, a local oscillator 15 tunable through the agency of its tank circuit 16, an intermediate frequency amplifier 17, a frequency modulation detector 18, and an audio frequency output system comprising an audio amplifier 19 and a loud-speaker 20. Variable capacitors or condensers 21, 22 and 23 which control the tuning of the antenna, radio frequency, and local oscillator stages, may be ganged together on a common shaft 24, shown diagrammatically in the drawing. All of the foregoing apparatus is conventional, and consequently it is deemed unnecessary to describe it in greater detail.

In present day practice, the apparatus, possibly with the exception of the antenna 10, is mounted in a single cabinet, the vibrating cone of the loud-speaker 20 being disposed adjacent a wall of said cabinet which serves as a sound baffle. Thus, it will be understood that sound vibrations transmitted from the loud-speaker, either directly or through the cabinet structure, tend to cause vibration of the tuning elements, particularly the rotor plates, of the oscillator tuning condenser or variable capacitor 23. Vibration of the rotor plates produces frequency modulation of the signal emitted by the local oscillator 15, and this frequency modulation is added to the output of the frequency converter 14. The resulting signal is amplified in the intermediate frequency amplifier 17, detected in the frequency modulation detector 18, further amplified in the audio amplifier 19 and finally reproduced in the loud-speaker 20. If this occurs in the proper phase, a sustained oscillation or "howl" may result and, in any event, the audio frequency response characteristic will be adversely affected.

Figure 2:
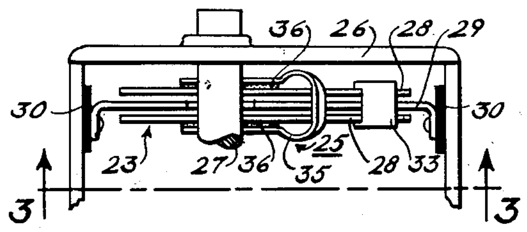
Figure 2 is a top plan view of that portion of the tuning condenser which controls the local oscillator, and shows the device of the invention in operative association with the rotor plates.
Figure 4:
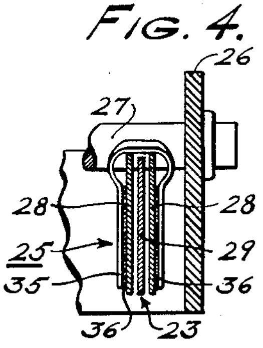
Figure 4 is a vertical cross-sectional view taken along line 4—4 of Figure 3.
Figure 3:
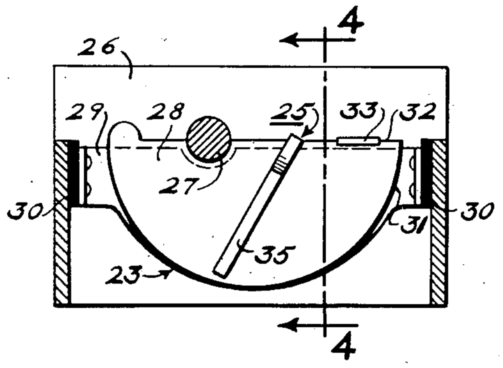
Figure 3 is a horizontal cross-sectional view taken along line 3—3 of Figure 2.

In accordance with the present invention, means diagrammatically shown at 25 in Figure 1, is provided to prevent the occurence of the action above described, and Figures 2, 3 and 4 illustrate a practical embodiment of this means as applied to conventional parts of the tuning condenser 23 which controls the local oscillator. As shown, these conventional parts include a frame 26, a rotor shaft 27, a pair of rotor plates 28 and a stator plate 29. The shaft 27 is rotatably supported on the frame 26; the rotor plates 28 are fixedly connected with the shaft for rotation therewith, and are disposed in paralleling spaced relation thereon; and the stator plate 29 is attached to, but insulated from, the frame as indicated at 30, and is stationarily suspended below the shaft and between the rotor plates. As is customary and as is more clearly shown in Figure 3, each rotor plate is of generally semicircular configuration presenting a curved marginal edge 31 and a substantially straight edge 32. A cross-piece 33 is secured to portions of the straight edges of the rotor plates to maintain said plates in proper alignment. The shaft 27 may be rotated axially in opposite directions to variably adjust the rotor plates 28 with respect to the stator, between positions completely interleaved with or clear out of the stator.

Figure 5:
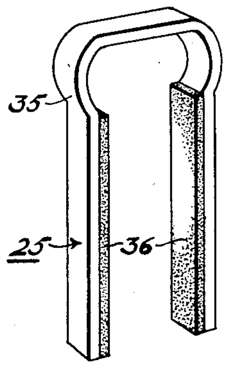
Figure 5 is a perspective view, on an enlarged scale, showing the preferred construction of the device employed in the arrangement illustrated in the preceding figures.

The embodiment and construction of means 25 can be more clearly seen in Figure 5. It comprises a spring device 35 fashioned substantially in the shape of a hair-pin, thus providing two parallel relatively spaced elongated leg members disposed for engagement with face portions of the rotor plates 28, as shown in Figures 2, 3 and 4. This device is adapted, when its said members are placed in proper engagement with the rotor plates, to impart such stiffness to said plates that their natural resonant frequency is well above the audio band. In this manner, acoustic regeneration or feedback action, due to vibration of the rotor plates, is effectively prevented. Moreover, the device 35 is such that it can readily be adjusted so that its mentioned member may assume various angular positions with respect to area of the plates. Because of this feature, it is possible to locate said members of the device in that exact position which most efficaciously produces damping of the plate vibrations. This damping effect is advantageously enhanced by providing the plate embracing members of device 35 with high friction substance, such as strips 36 of viscous material, for example synthetic plastic or the like. Such strips of high friction material further serve as means for effectively retaining the device 35 in proper position on the plates.

Preferably, the spring device 35 should be formed of flattened wire or metallic ribbon stock. In any event, the plate engaging members of the device should have sufficient rigidity to serve the desired purpose, but should be such that the spring pressure on the capacitor plates does not cause gradual lateral shifting of said plates.

In using the device constructed in accordance with the invention, the rotor plates are selectively moved to a tuning position where the most pronounced microphonic action occurs. With the plates held in that position, the device 35 is inserted in the condenser in such a manner that the bent portion of the device spans the straight marginal edges 32 of the plates, and the leg members of said device embracingly straddle the outside surface of said plates along a line approximately bisecting the area of the latter which is in mesh with the stator. When device 35 is thus located, the plate embracing members of the device should extend to a point in close proximity to the curved marginal edges of the plates so as to obtain the greatest damping effect possible.

From the foregoing description, it will be appreciated that the invention provides an arrangement which is extremely simple but which is most effective in solving the troublesome problem of microphonics which arise from vibration of the rotor plates of an oscillator tuning capacitator.

While a preferred embodiment of the the invention has been particularly shown and described, it is to be understood that the invention is not limited to such embodiment.

I claim:

1. In a radio receiving system, a radio receiver, a radio tuning assembly for said receiver including a pair of parallel relatively spaced rotor plates having a natural tendency to vibrate, and a device for imparting to the plates such stiffness in relation to their mass as to prevent said plates from vibrating within the audio frequency range, said device consisting of two interconnected yieldable leg members disposed in parallel spaced relationship, one member overlying a portion of one face of one of said plates, the other member overlying a portion of one face of the other of said plates, and both members being provided with friction material contacting said portions to provide retaining means for said device.

2. For radio apparatus, a tuning condenser comprising a pair of parallel relatively spaced capacitor plates having a tendency to vibrate, and a device for imparting to the plates such stiffness in relation to their mass as to prevent said plates from vibrating within the audio frequency range, said device consisting of two interconnected yieldable leg members disposed in parallel spaced relationship, one member overlying a portion of one face of one of said plates, the other member overlying a portion of one face of the other of said plates, and both members provided with friction material contacting said portions to provide retaining means for said device.

3. For radio condensers of the type including a pair of parallel relatively spaced rotor plates having a natural period of vibration within the audio frequency range, a device for imparting to the plates such stiffness in relation to their mass as to prevent said plates from vibrating within such range, said device consisting of a pair of parallel relatively spaced and interconnected yieldable leg members provided with high friction material, one of said members disposed to overlie a portion of one face of one of said plates, the other of said members disposed to overlie a portion of one face of the other of said plates, and said material being disposed to contact said portions to provide retaining means for said device.

JOHN J. MERKLINGER.

REFERENCES CITED

The following references are of record in the file of this patent:

UNITED STATES PATENTS

| Number | Name | Date |
|---|---|---|
| 536,634 | Kyle | Apr. 2, 1895 |
| 1,457,069 | Levy | May 29, 1923 |
| 1,849,499 | McLaughlin | Mar. 15, 1932 |
| 1,849,651 | Anderson | Mar. 15, 1932 |
| 1,893,779 | Levy | Jan. 10, 1933 |
| 2,057,097 | Hammer | Oct. 13, 1936 |
| 2,078,447 | Grundler | Apr. 27, 1937 |
| 2,193,115 | Smith | Mar. 12, 1940 |
| 2,251,995 | Godsey | Aug. 12, 1941 |
| 2,282,858 | Flanzer | May 12, 1942 |

FOREIGN PATENTS

| Number | Country | Date |
|---|---|---|
| 749,290 | France | May 2, 1933 |
| 368,401 | Germany | Feb. 2, 1923 |
| 3,581 | Great Britain | of 1909 |